US010482396B2

(12) United States Patent
Dick et al.

(10) Patent No.: US 10,482,396 B2
(45) Date of Patent: Nov. 19, 2019

(54) SYSTEM AND METHOD FOR AUTOMATED COMPLIANCE VERIFICATION

(75) Inventors: Zane Dick, Webster, NY (US); Gary Lalonde, Hilton, NY (US); Janna Pulver, Rochester, NY (US); Rowan C. Seidel, Rochester, NY (US); Lora Thody, Rochester, NY (US)

(73) Assignee: Refinitiv US Organization LLC, New York, NY (US)

( * ) Notice: Subject to any disclaimer, the term of this patent is extended or adjusted under 35 U.S.C. 154(b) by 424 days.

(21) Appl. No.: 13/422,949

(22) Filed: Mar. 16, 2012

(65) Prior Publication Data

US 2013/0246291 A1   Sep. 19, 2013

(51) Int. Cl.
*G06Q 10/00*   (2012.01)

(52) U.S. Cl.
CPC .................... *G06Q 10/00* (2013.01)

(58) Field of Classification Search
CPC ...... G06Q 10/00; H04L 63/04; H04L 63/0428
See application file for complete search history.

(56) References Cited

U.S. PATENT DOCUMENTS

| 6,064,968 | A * | 5/2000 | Schanz | G06Q 50/18 |
| | | | | 705/2 |
| 6,266,683 | B1 * | 7/2001 | Yehuda | G06F 16/93 |
| | | | | 715/234 |
| 6,745,197 | B2 | 6/2004 | McDonald | |
| 6,763,460 | B1 * | 7/2004 | Hild | H04L 29/06 |
| | | | | 375/240.13 |
| 7,523,135 | B2 * | 4/2009 | Bradford | G06Q 10/06 |
| 7,689,411 | B2 | 3/2010 | Sandor et al. | |
| 7,742,998 | B2 * | 6/2010 | Stiffler | G06Q 10/0831 |
| | | | | 705/331 |
| 7,966,220 | B2 | 6/2011 | Clark | |
| 9,032,544 | B2 * | 5/2015 | Shelton | G06F 21/6245 |
| | | | | 726/28 |
| 2003/0115080 | A1 | 6/2003 | Kasravi et al. | |

(Continued)

OTHER PUBLICATIONS

Thomson Reuters Accelus, Regulatory Intelligence Solutions, From way back machine, Nov. 2011. 13 pages.*

(Continued)

*Primary Examiner* — Gerardo Araque, Jr.
(74) *Attorney, Agent, or Firm* — Faegre Baker Daniels LLP

(57) ABSTRACT

A compliance computer creates compliance documents referencing one or more rules with which an entity must comply and/or a jurisdiction and topic related to rules with which the company must comply. For example, the compliance documents may identify one or more jurisdictions in which the company operates, one or more topics associated with the company, and/or specific provisions set by specific rules. A transmission object is created based on the compliance documents. The transmission object includes general information pertinent to the rules and/or the entity (e.g., jurisdictional or topical information). An operator server receives one or more transmission objects from one or more compliance computers. The operator server identifies rules pertinent to each transmission object and conducts a search to determine whether any of those rules have been modified. The operator server sends a signal that is associated with the one or more compliance rules to the compliance computer.

22 Claims, 8 Drawing Sheets

(56) References Cited

U.S. PATENT DOCUMENTS

| | | | |
|---|---|---|---|
| 2003/0131011 | A1 | 7/2003 | Haunschild et al. |
| 2003/0217290 | A1* | 11/2003 | Dick ................... G06F 21/6245 |
| 2004/0123242 | A1* | 6/2004 | McKibben .............. G06F 16/10 715/201 |
| 2004/0139053 | A1 | 7/2004 | Haunschild |
| 2004/0216039 | A1* | 10/2004 | Lane ....................... G06F 17/24 715/229 |
| 2004/0243428 | A1* | 12/2004 | Black .................... G06Q 10/10 705/320 |
| 2005/0075979 | A1* | 4/2005 | Leavitt et al. ................... 705/40 |
| 2005/0283374 | A1 | 12/2005 | Salomon et al. |
| 2006/0026042 | A1* | 2/2006 | Awaraji ................ G06F 19/328 705/3 |
| 2006/0106763 | A1* | 5/2006 | Dirisala ............................ 707/3 |
| 2006/0173917 | A1 | 8/2006 | Kalmick et al. |
| 2007/0094284 | A1 | 4/2007 | Bradford et al. |
| 2007/0118598 | A1 | 5/2007 | Bedi et al. |
| 2007/0143355 | A1* | 6/2007 | Fry et al. ....................... 707/201 |
| 2007/0180258 | A1* | 8/2007 | Broussard ........... G06F 21/6245 713/182 |
| 2007/0198854 | A1* | 8/2007 | Suzuki .................... G06F 21/10 713/189 |
| 2007/0279672 | A1* | 12/2007 | Harada .............. H04N 1/32144 358/1.14 |
| 2008/0015883 | A1* | 1/2008 | Hermann .......................... 705/1 |
| 2008/0040125 | A1 | 2/2008 | Okabe et al. |
| 2008/0134177 | A1 | 6/2008 | Fitzgerald et al. |
| 2008/0256133 | A1 | 10/2008 | Frankland et al. |
| 2008/0262883 | A1* | 10/2008 | Weiss .................... G06Q 10/00 705/7.42 |
| 2009/0037215 | A1 | 2/2009 | Dale |
| 2009/0119141 | A1 | 5/2009 | McCalmont et al. |
| 2009/0177664 | A9* | 7/2009 | Hotchkiss et al. ............ 707/100 |
| 2009/0241165 | A1 | 9/2009 | Tyree et al. |
| 2009/0265199 | A1* | 10/2009 | Moerdler ............... G06Q 10/00 705/7.39 |
| 2010/0036684 | A1 | 2/2010 | McNamee et al. |
| 2011/0258141 | A1 | 10/2011 | Levering et al. |
| 2011/0282771 | A1 | 11/2011 | Reich et al. |
| 2012/0004945 | A1* | 1/2012 | Vaswani ................ G06Q 10/06 705/7.28 |
| 2012/0010979 | A1 | 1/2012 | Ramer et al. |
| 2012/0130914 | A1 | 5/2012 | Kinghorn et al. |
| 2012/0159296 | A1* | 6/2012 | Rebstock et al. ............. 715/205 |
| 2013/0013999 | A1 | 1/2013 | Kerry-Tyerman et al. |
| 2013/0246291 | A1 | 9/2013 | Dick et al. |
| 2013/0246292 | A1* | 9/2013 | Dick ....................... G06Q 10/00 705/317 |

OTHER PUBLICATIONS

Axel Buecker et al, "IT Security Compliance Management Design Guide with IBM Tivoli Security Information and Event Manager," International Business Machines Corporation, Second Edition, Jul. 2010 (Year: 2010).*

Thomson Reuters ACCELUS brochure, available at http://accelus.thomsonreuters.com/?ref=complinet, downloaded Mar. 16, 2012.

Thomson Reuters ACCELUS brochure, available at http://accelus.thomsonreuters.com/solutions/compliance-management/accelus-compliance-manager, downloaded Mar. 16, 2012.

Thomson Reuters ACCELUS brochure, available at http://accelus.thomsonreuters.com/solutions/regulatory-intelligence/compliance-complete, downloaded Mar. 16, 2012.

Thomson Reuters ACCELUS brochure, Compliance Management Solutions, Accelus Compliance Manager, available at http://accelus.thomsonreuters.com/solutions/compliance-management/accelus-compliance-manager, downloaded Apr. 13, 2012.

Thomson Reuters ACCELUS brochure, Compliance Management Solutions, Policy Manager description, available at http://accelus.thomsonreuters.com/solutions/compliance-management/policy-manager, downloaded Apr. 13, 2012.

Thomson Reuters ACCELUS brochure, Introducing Accelus Compliance Manager, available at http://accelus.thomsonreuters.com/?ref=complinet.com, downloaded Apr. 13, 2012.

Thomson Reuters ACCELUS brochure, Regulatory Intelligence Solutions, Expert & Timely Regulatory News, Analysis and Tracking, available at http://accelus.thomsonreuters.com/solutions/regulatory-intelligence/compliance-complete, downloaded Apr. 13, 2012.

International Search Report and Written Opinion issued in PCT/US2013/032087, dated May 28, 2013, 20 pages.

International Search Report and Written Opinion issued in PCT/US2013/032097, dated Jun. 4, 2013, 11 pages.

Extended European Search Report issued in EP13761219.8, dated Oct. 15, 2015, 4 pages.

Extended European Search Report issued in EP137620092, dated Oct. 15, 2015, 4 pages.

Singapore Written Opinion issued in SG Application 11201405782P, dated Oct. 23, 2015, 5 pages.

Singaporean Search Report issued in SG Application No. 11201405781R, dated Dec. 4, 2016, 5 pages.

Singaporean Written Opinion issued in SG11201405782P, dated Sep. 15, 2016, 7 pages.

Singapore Written Opinion issued in SG11201405781R, dated Jul. 6, 2015, 7 pages.

* cited by examiner

SYSTEM AND METHOD FOR AUTOMATED COMPLIANCE VERIFICATION

CROSS-REFERENCE TO RELATED APPLICATION

The present application is filed on the same day as a related application entitled "SYSTEM AND METHOD FOR VERIFIED COMPLIANCE IMPLEMENTATION," U.S. patent application Ser. No. 13/422,955, the contents of which are incorporated herein by reference in their entirety for all purposes.

TECHNICAL FIELD

Embodiments of the present invention generally relate to systems and methods for automated compliance verification. More specifically, embodiments of the present invention relate to systems and methods for automatically verifying the accuracy of rules used in a compliance process.

BACKGROUND

Entities are often required to comply with rules set by various authorities on a wide variety of topics. For example, regulatory authorities may promulgate rules with respect to environmental protection or other compliance areas. Those rules may seek to control the amount of harmful substances that are produced, used, transported, or discarded by an entity. Overall, entities will need to conform to a potentially large number of rules on any number of issues, especially if those entities use remote sites located in satellite jurisdictions, which multiplies the number of rules with which those entities must comply. As part of their compliance efforts, many entities create compliance documents that identify rules pertinent to their operations. Those rules may change over time.

SUMMARY

To assist an entity in complying with, e.g., rules promulgated by regulatory authorities, some embodiments of the present invention operate to inform an entity of changes or updates to rules contained in its compliance documents. In particular, a compliance computer creates and sends a transmission object, which contains data referencing the rules contained in the compliance documents, to an operator server. The operator server searches for updates to the rules referenced in the transmission object and informs the entity if any updates are found. The transmission object may also reference jurisdictions and topics associated with the entity's operations, in which case the operator server uses that data to identify rules and/or updates to rules applicable to the entity's operations. The entity may then use the information from the operator server to update its compliance documents. In this manner, the entity accesses the most current information and increases its ability to comply with all the pertinent rules in all relevant jurisdictions.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
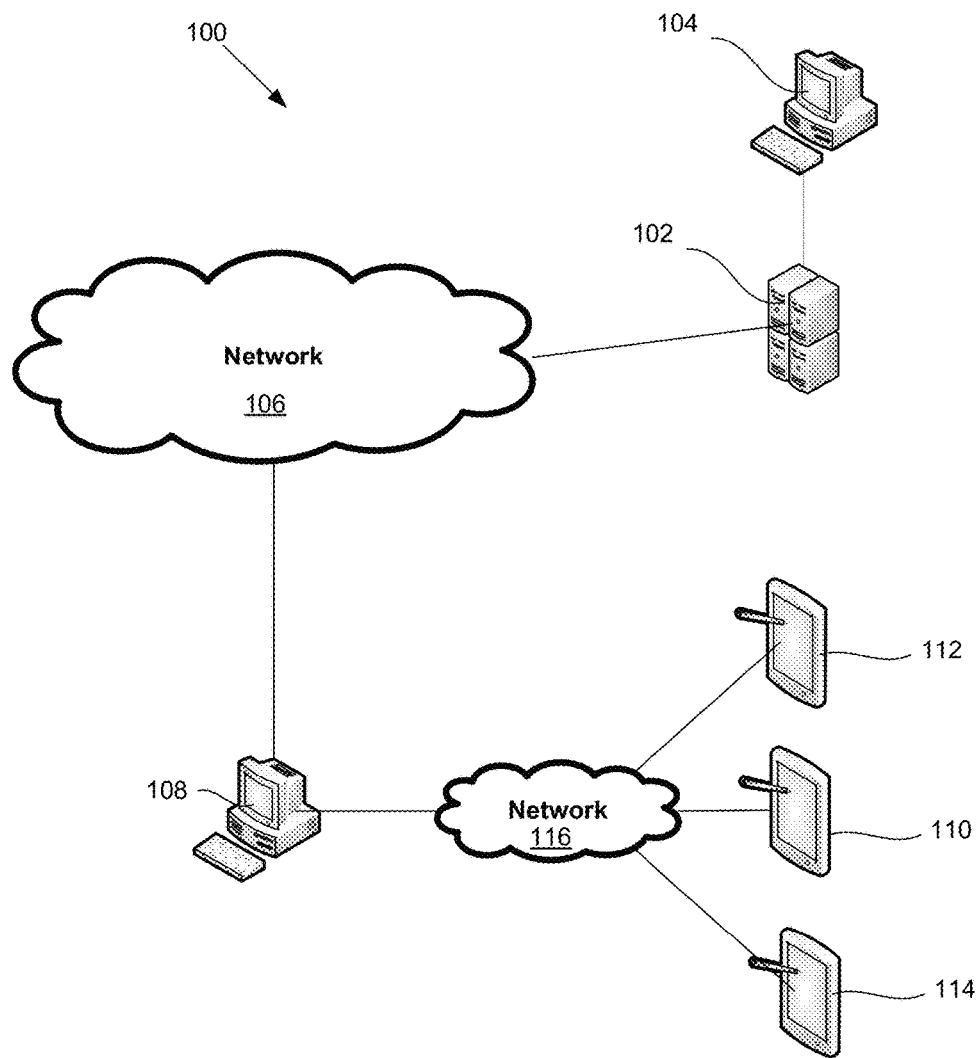
FIG. 1 illustrates an exemplary networked environment in accordance with embodiments of the present invention and in which embodiments of the present invention may operate.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

According to some embodiments of the present invention, an entity, for example a company operating coal-powered electric plants, creates compliance documents that assist the entity in complying with various rules pertinent to its operations, such as air pollution regulations. Because new rules may be added and existing rules altered or changed, for example, by the Environmental Protection Agency, the entity may wish to update its compliance documents by incorporating any regulatory updates pertinent to its operations into its compliance documents. At the same time, because compliance documents often contain sensitive or private information, the entity may not wish to transmit the compliance documents, and in particular the confidential information in the compliance documents, to unsecured or external sites.

To keep abreast of changes to pertinent rules, in some embodiments the entity creates and sends a transmission object to an operator server, which informs the operator server of rules referenced in the entity's compliance documents. At the same time, the transmission object may exclude confidential information found in the compliance documents. As used herein, the term "transmission object" refers to an object or other form of information that may be sent between two computers. A transmission object may be based on, for example, xml, html, or any other data format and may be used with any transmission protocol.

The operator server receives the transmission object and uses the data in the transmission object to identify updates to the rules referenced in the entity's compliance documents. In some embodiments, instead of referencing the rules contained in the compliance documents, or in addition to referencing those rules, the transmission object may contain data representing references to various jurisdictions in which the entity operates (e.g., New York) and/or topics relevant to the entity's operations (e.g., coal-powered electric plants or air pollution). The operator server receives that transmission object and searches for rules and updates to rules pertinent to those jurisdictions and/or topics. The operator server then communicates the identified updates or rules to the entity, which may then incorporate that information into its compliance documents.

Referring now to FIG. 1, several embodiments of the present invention (as well as environments in which they operate) utilize multiple computers connected over a network, such as the Internet. Specifically, a networked environment 100 may include an operator server 102 and an operator computer 104. The operator server 102 and the operator computer 104 are connected to a network 106, such as the Internet. The operator server 102 and/or the operator computer 104, either alone or in combination, receive transmission objects from various entities over the network 106 and use those transmission objects to identify rules or updates to rules pertinent to each entity. For example, the operator server 102 receives a transmission object from an entity and reads that transmission object to identify rules referenced in that entity's compliance documents. The operator server 102 then searches a rules database (e.g., 264 in FIG. 2B), which contains updates to various rules in various jurisdictions, to identify specific updates to the rules in the transmission object. The operator server 102 then conveys those updates to the entity over the network 106. In some embodiments, the operator server 102 is also equipped to maintain one or more rules databases. In particular, and as explained in more detail below, the operator server 102 obtains and stores a variety of rules and updates to rules (e.g., modifications, interpretations, commentary, etc.) in one or more rules databases, for example, a remote data storage unit (264 in FIG. 2B).

Also connected to the network 106 is a compliance computer 108. The compliance computer 108 is typically located at an entity and is used to create and send the transmission object, and includes software (e.g., word processing programs) that enable a compliance implementer (e.g., a compliance officer) to draft and/or update compliance documents, such as a compliance manual. After the compliance computer 108 receives a notification from an operator server 102 that identifies changes to pertinent rules, the compliance computer 108 may be used to update the compliance documents.

One or more engineer (e.g., satellite) computers 110, 112, and 114 may be connected to the compliance computer 108 through a separate network 116. In some embodiments, the engineer computers 110, 112, and 114 are connected to the compliance computer 108 through the network 106. The networks 106 and 116 may be, e.g., the Internet, a local area network, a local intranet, or a cell phone network. The compliance computer 108 and/or the engineer computers 110, 112, and 114 may each be a smart phone, a tablet computer, a desktop computer, or any other computing device and, as explained below in more detail, may be used to audit or verify the entity's compliance with pertinent rules. For example, in some embodiments, once the compliance documents are updated, the compliance computer 108 sends those documents (or selected portions of those documents) to satellite locations to assist compliance personnel in completing audits or reports regarding each satellite location's compliance with the rules (and thus the entity's overall compliance with the rules). If those compliance documents include audit or reporting forms, the engineer computers 110, 112, and 114 are used to complete those forms and send the completed forms back to the compliance computer 108. The compliance computer 108 receives the completed audits or reports and compiles a final report that may be transmitted to internal or external authorities.

While FIG. 1 depicts a small networked environment, in some embodiments the networked environment 100 includes a plurality of operator servers 102, operator computers 104, networks 106, compliance computers 108, and/or engineer computers 110, 112, or 114.

Figure 2A:
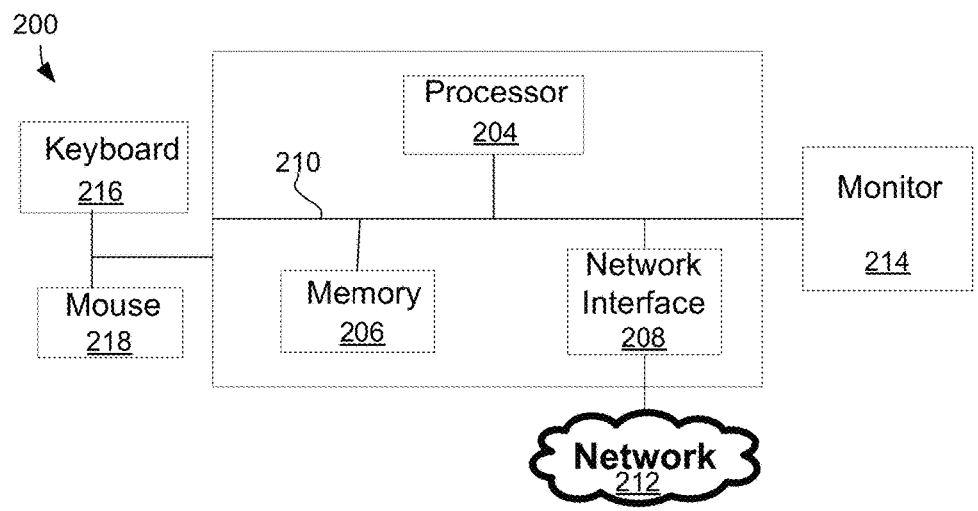
FIG. 2A illustrates an exemplary computer in accordance with embodiments of the present invention.
Figure 2B:
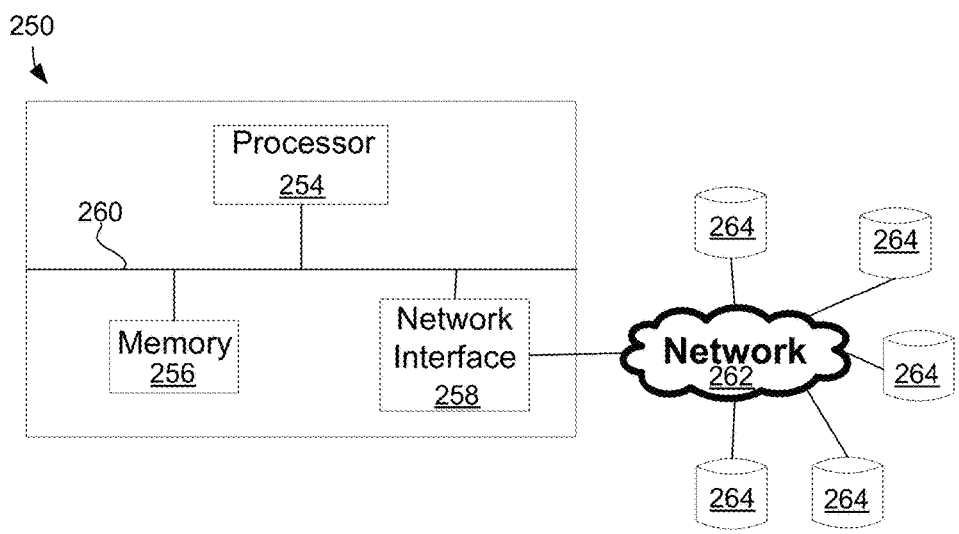
FIG. 2B illustrates an exemplary computer server in accordance with embodiments of the present invention.

FIG. 2A illustrates a computer system 200, and aspects thereof, that may serve as an operator computer 104, a compliance computer 108, and/or an engineer computer 110, 112, or 116. The illustrated computer system 200 includes a processor 204 coupled to a memory 206 and a network interface 208 through a bus 210. The network interface 208 is also coupled to a network 212 such as the Internet. The computer system 200 may further include a monitor 214, a keyboard 216, and a mouse 218. In other embodiments, the computer system 200 may use other mechanisms for data input/output and may include a plurality of components (e.g., a plurality of memories 206 or buses 210). FIG. 2B illustrates a computer server 250 and aspects thereof, which may serve as an operator server 102. The illustrated computer server 250 includes a processor 254 coupled to a memory 256 and a network interface 258 through a bus 260. The network interface 258 is also coupled to a network 262 such as the Internet. In other embodiments, the computer server 250 may include a plurality of components (e.g., a plurality of memories 256 or buses 260). The network 262 may include a remote data storage system including a plurality of remote storage units 264 configured to store data at remote locations. Each remote storage unit 264 may be network addressable storage. In some embodiments, the computer system 200 and/or the computer server 250 include a computer-readable medium containing instructions that cause the processor 254 to perform specific functions that will be described in more detail below. That medium may include a hard drive, a disk, memory, or a transmission, among other computer-readable media.

Figure 3:
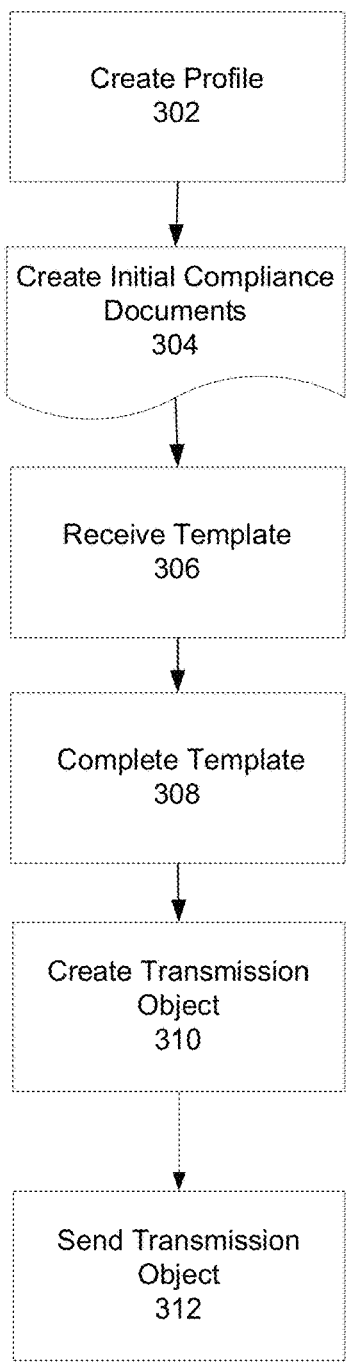
FIG. 3 illustrates a flow chart depicting steps for completing a template and creating a transmission object according to embodiments of the present invention.

The flow chart shown in FIG. 3 illustrates specific steps that the compliance computer 108 (automatically and/or in conjunction with the compliance officer) may perform. Not every step shown in FIG. 3 is used in every embodiment, and different embodiments include various combinations of the steps shown in FIG. 3 or possibly additional steps than those shown in FIG. 3.

In some embodiments, before creating the transmission object or perhaps even before creating the compliance documents, the compliance computer 108 (automatically and/or in conjunction with the compliance officer) creates a profile as shown in block 302. The profile contains information about the entity, such as, for example, jurisdictions in which it operates, general areas of operation, specific rules or areas of regulation with which the entity may be concerned, the frequency at which the entity wishes to receive updates, an identifier for that entity, and/or other information related to the entity and its operations. The compliance computer 108 may automatically create select portions of the profile or it may automatically create all of the profile. If the compliance officer is involved in creating the profile (in whole or in part), the compliance computer 108 may access a set of questions that are stored, e.g., on the operator server 102 to assist the compliance officer in completing the profile. The completed profile is then transmitted to the operator server 102, which uses a profile receiver to receive the profile. The operator server 102 then stores the completed profile in its memory.

As shown in block 304, the compliance computer 108 is also used to create initial compliance documents. In some embodiments, the profile (in particular the information contained in the profile) is used to assist in the creation of the initial compliance documents. Specifically, the operator server 102 uses the profile to identify and transmit specific information to the operator computer 108 to guide the compliance officer in drafting the initial compliance documents. For example, if the profile indicates that the entity is involved in coal-powered electric plants, the operator server 102 may create and transmit a custom document or transmission that prompts the compliance officer to input particular information into specific sections of the initial compliance documents (e.g., a prompt suggesting that key terms or phrases associated with carbon dioxide or coal-powered electric plants be placed into section 7(d) of the initial compliance documents). In some embodiments, the compliance computer 108 automatically incorporates the information sent by the operator server 102 into the initial compliance documents, e.g., into the specific sections identified by the operator server 102. The profile may also be used when creating and/or completing a template, as discussed below in more detail.

The initial compliance documents may include, for example, a compliance manual, audit forms, audit instructions, reporting forms, and/or reporting instructions. The initial compliance documents may also include pictures, illustrations, measurements, diagrams, charts, etc. In general, the initial compliance documents include information relating to the rules with which the entity (e.g., a company) must comply. A rule may be a law, regulation, recommendation, standard, guideline, and/or provision intended to direct, control, and/or monitor a company's actions, whether formally or informally. Some rules are external rules promulgated by regulatory authorities that operate on a local, regional, national, and/or international level. Other rules may be internal rules issued by the company itself. For example, if a particular state regulation limits the amount of carbon dioxide emissions to 1,100 lbs. per megawatt-hour, the company may issue an internal rule that requires less than 1,000 lbs. per megawatt-hour. The rules may apply to any number of topics, such as manufacturing, retail, transportation, health, medical equipment, pharmaceuticals, food, education, workplace safety, privacy, communications, labor/employment, financial, billing, human resources, cross-border finances, etc. For example, the Foreign Corrupt Practices Act and Anti-Money Laundering Laws are designed to target international and cross-border actions.

In some embodiments, the initial compliance documents indicate one or more jurisdictions (e.g., Ohio, China) in which the company operates. The initial compliance documents may also indicate a topic (e.g., air pollution) or a specific rule (e.g., a regulation issued by the Environmental Protection Agency or a particular guideline or standard internal to the company). Thus, the initial compliance documents may include references to specific rules, references to topics pertinent to the entity's operations, references to the jurisdictions in which the entity is operating, and/or other, similar information. In addition, the initial compliance documents may designate specific steps and procedures for identifying and reporting a company's compliance with those rules and standards. For example, in some embodiments, the initial compliance documents identify particular evidence (e.g., photographs) that should be submitted during an audit.

The initial compliance documents may also instruct users on how to respond if the company is not in compliance with one or more rules. For example, the initial compliance documents may direct employees to inform specific compliance agencies or individuals within the company of a failure to comply. Thus, the initial compliance documents may include confidential information about how the entity plans to act with respect to one or more rules, guidelines for ensuring compliance, or actions to take if the entity is not in compliance with one or more rules, or other information of a confidential nature. Other examples of confidential information include employee identification (names, positions, etc.), internal standards that differ between satellite locations, statements that the entity emits certain substances (e.g., carcinogenic substances) even if the amounts emitted are below the standards set in the rules, etc.

According to some embodiments, after the initial compliance documents are complete, the compliance computer 108 receives a template, as shown in block 306. The template may be generated by the operator server 102 using a template generator. The template can be a computer object based on, for example, xml code or javascript. The template may use any coding formats compatible with, for example, word processing documents, html, xml, etc. In some embodiments, the template contains instructions or prompts that assist the compliance officer and/or compliance computer in completing the template. Those instructions or prompts may be generated using the information in the entity's profile. In other embodiments, the template does not contain instructions or prompts of any kind.

The template is used to store tags or metadata identifying the rules in the initial compliance documents or the jurisdictions and/or topics relevant to the entity's operations. The compliance computer 108 (possibly in conjunction with the compliance officer) completes the template using the compliance documents, as shown in block 308. In some embodiments, to complete the template, the compliance computer 108 (possibly in conjunction with the compliance officer) first creates metadata or tags to identify the jurisdictions, topics, and/or specific rules referenced in the initial compliance documents. The metadata or tags may also identify the specific sections of the initial compliance documents, for example, page 4 or section 2(b), where the jurisdictions, topics, and/or specific rules are referenced. The compliance computer 108 (possibly in conjunction with the compliance officer) then completes the template by incorporating those tags or metadata into the template.

Figure 4:
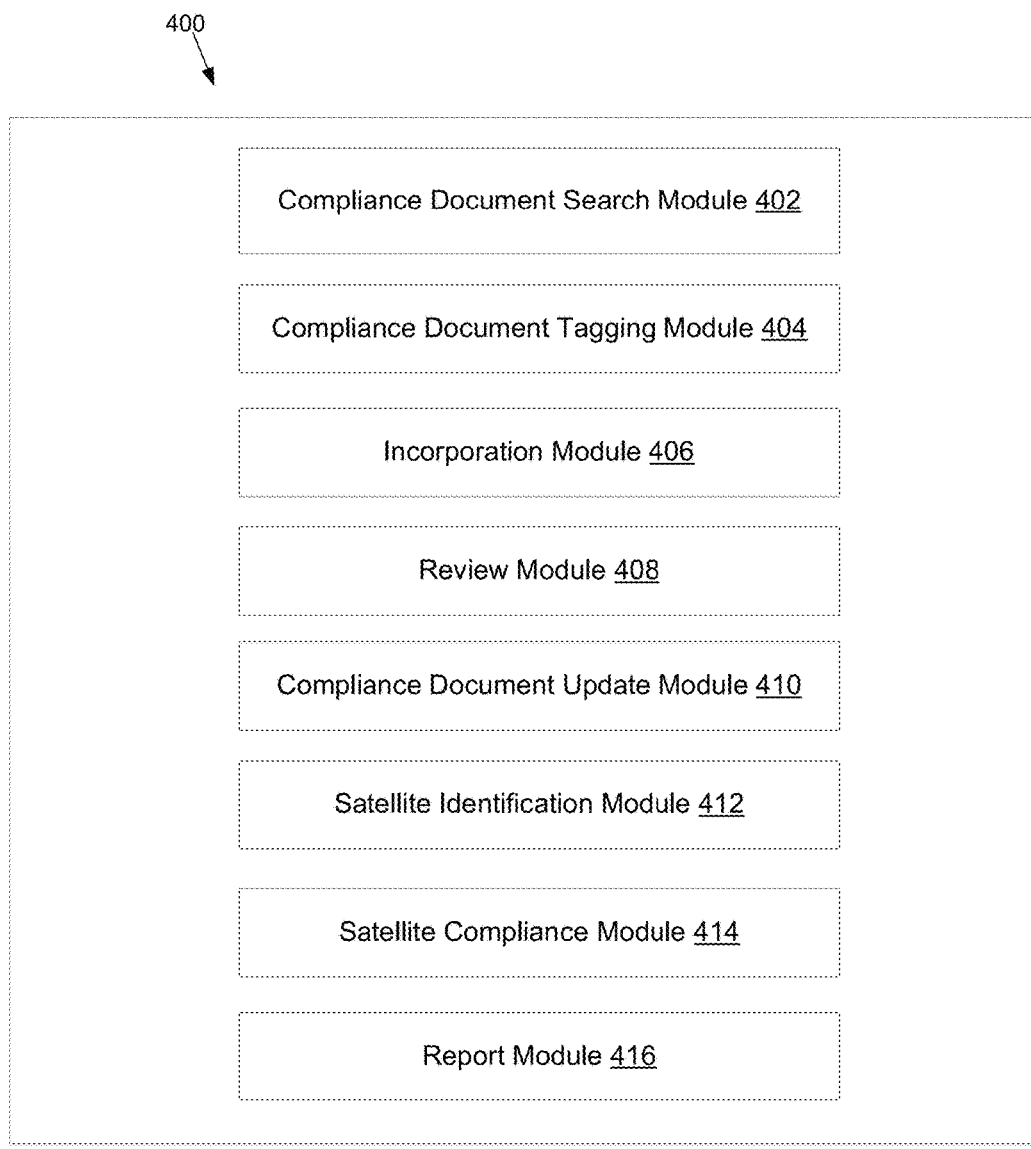
FIG. 4 illustrates software modules that may be used to perform some of the steps illustrated in the flow chart of FIG. 3.

In some embodiments, the compliance computer 108 includes software that enables it to automatically search the initial compliance documents for references to jurisdictions, topics, rules, or similar information, and automatically compile that information into the template. For example, FIG. 4 illustrates various software modules 400 that the compliance computer 108 may execute as part of that process. Those software modules 400 may be written in programming languages such as, for example, C+.NET or Java. The software modules 400 may communicate with each other in any number of ways. For example, when the compliance computer 108 executes the compliance document search module 402, it creates data that is accessed when the compliance computer 108 executes the compliance document tagging module 404. The other software modules may likewise communicate with each other.

In particular, in some embodiments, the compliance document search module 402 operates to search the initial compliance documents for key terms or phrases, for example, using a text-based search that matches the content of the initial compliance documents against a pre-formed list of key terms or phrases. In some embodiments, the set of key terms or phrases used by the search module 402 include key terms or phrases associated with jurisdictions (e.g., Ohio, China, etc.) and/or topics (e.g., Air Pollution, $CO_2$, Power Plants, etc.), among other information, which can be used to identify one or more rules. The set of key terms and phrases may also include key terms or phrases that directly identify one or more rules (e.g., CFR). The set of key terms or phrases may be customized for a particular entity. For example, if the entity operates coal-powered electric plants, the compliance document search module 402 may be programmed to search the compliance documents for particular key terms (e.g., carbon dioxide, parts per million, scrubbing, etc.) or particular regulations (e.g., specific EPA regulations). In some embodiments, the set of key terms or phrases is compiled based on information in the entity's profile. For example, if the entity's profile identifies particular jurisdictions (e.g., New York) or industries (e.g., coal-powered electric plants), the set of key terms or phrases would include key terms or phrases specific to those jurisdictions and/or industries. If the initial compliance documents were drafted with key terms or phrases in specific sections of the compliance documents, then the compliance document search module 402 may search only those particular sections for the key terms or phrases. The set of key terms or phrases may be sent from the operator server 102 to the compliance computer 108 (and in particular the compliance document search module 402).

Once the compliance document search module 402 identifies one or more key terms or phrases in the initial compliance documents, the compliance document tagging module 404 operates to create tags or metadata identifying the rules, jurisdictions, topics, and/or key terms or phrases in the initial compliance documents. The compliance document tagging module 404 may also create tags or metadata identifying the section or sections of the initial compliance documents that reference the rules, jurisdictions, topics, and/or key terms or phrases. An incorporation module 406 then operates to compile the tags or metadata into a separate computer object. That computer object may be the template or it may be a transmission object, which is discussed in more detail below. In some embodiments, after the incorporation module 406 has compiled the tags or metadata, a review module 408 presents the tags or metadata to the compliance officer. The compliance officer then reviews and approves the tags or metadata. In addition, the compliance officer may use the review module 408 to add new tags or metadata, edit the existing tags or metadata, or remove tags or metadata.

According to some embodiments, the completed template includes only the tags or metadata associated with the initial compliance documents, without including specific language, particular policies, or other confidential information contained in the initial compliance documents. For example, the initial compliance documents may reference multiple jurisdictions (e.g., New York, Ohio, and China), a topic (e.g., air pollution), and multiple rules (e.g., specific regulations by the EPA) associated with its operations in particular sections of the compliance documents (e.g., rules relating to air pollution in New York may be in section 7(d) of the initial compliance documents and rules relating to air pollution in Ohio may be in section 12(b) of the initial compliance documents). The compliance documents may further include confidential information, such as actions to take if the entity is not in compliance. The compliance computer 108, perhaps in conjunction with the compliance implementer, searches the initial compliance documents and creates tags that identify the jurisdictions, the topic, the rules, as well as the sections in which they are referenced. Only those tags or metadata are placed into the template, such that the confidential information remains solely in the initial compliance documents.

Referring back to step 304 and 306 of FIG. 3, in some embodiments the template is received (step 306) before the initial compliance documents are created (step 304). In those embodiments, the template may include specific information to assist the compliance officer and/or compliance computer 108 in creating the initial compliance documents. For example, if the profile indicates that the entity is involved in coal-powered electric plants, the operator server 102 may create and transmit a custom template that directs the compliance officer and/or compliance computer 108 to input particular information into specific sections of the template. In particular, the template may prompt the compliance officer to input key terms associated with carbon dioxide or coal-powered electric plants into section 7(d) of the template. The template may also prompt the compliance officer to input specific information into the template, such as how old the coal-powered electric plants are. In other words, these prompts may assist the compliance officer in identifying and supplying key terms relevant to the pertinent rules, or the prompts may be more general questions designed to guide the compliance officer in a more general fashion. In the embodiments in which the template prompts the compliance officer to input information into the template itself, the completed template may operate (in whole or in part) as the initial compliance documents. In those embodiments, the software modules 400 shown in FIG. 4 may be modified to operate on the template, rather than on the initial compliance documents themselves.

As shown in block 310 in FIG. 3, the compliance computer 108 uses the metadata or tags in the template to create a transmission object. Alternatively (or in addition), the compliance computer 108 may compile that tags or metadata directly into the transmission object. In some embodiments, the compliance computer 108 uses the incorporation module (406 in FIG. 4) to incorporate the tags or metadata created by the compliance document tagging module 404 into the transmission object. The incorporation module 406 may include only the tags or metadata from the compliance document tagging module 404, such that the transmission object will not include confidential information, for example, regarding how the entity intends to comply with the rules. The transmission object may also include specific search requests (e.g., articles in the New York Times discussing coal-powered electric plants in the last six months) for the operator server 102 to perform.

Once created, the transmission object is sent to the operator server 102, as shown in block 312 of FIG. 3. The transmission object may be sent wirelessly using a cellular telephone connector, wireless internet adaptor, through a wired connection to the Internet, or using any other communication structure.

Figure 5:
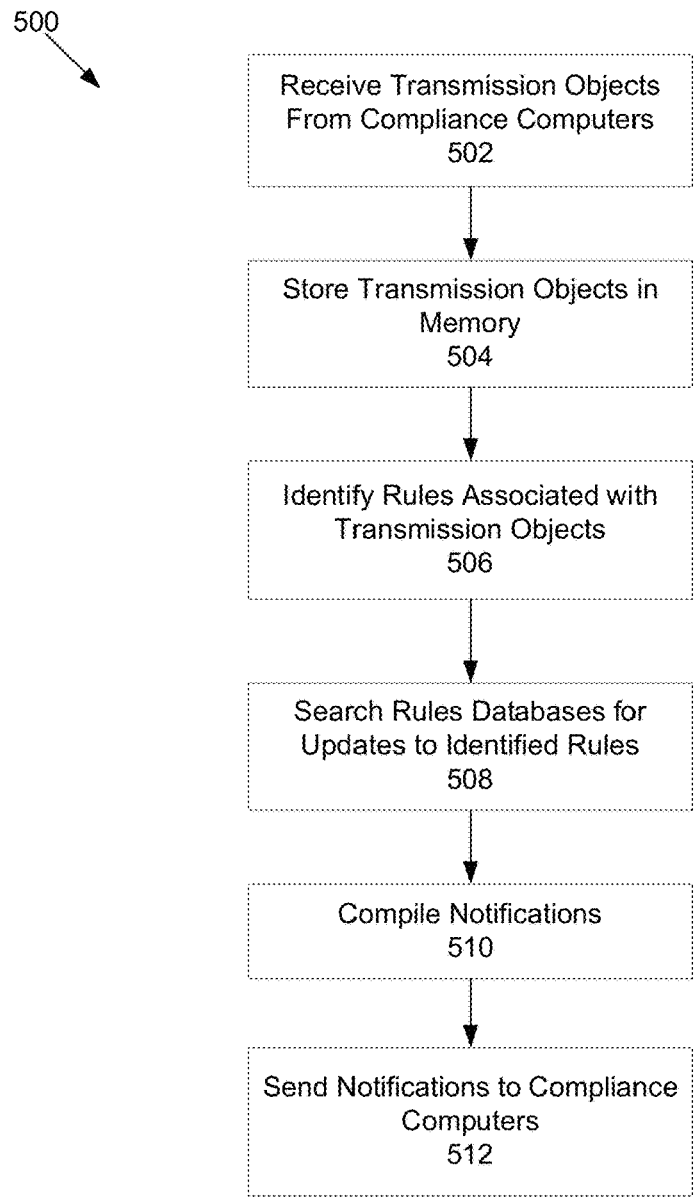
FIG. 5 illustrates a flow chart depicting steps for receiving a transmission object and compiling and sending a notification reflecting a rule or a change to a rule using that transmission object according to embodiments of the present invention.
Figure 6:
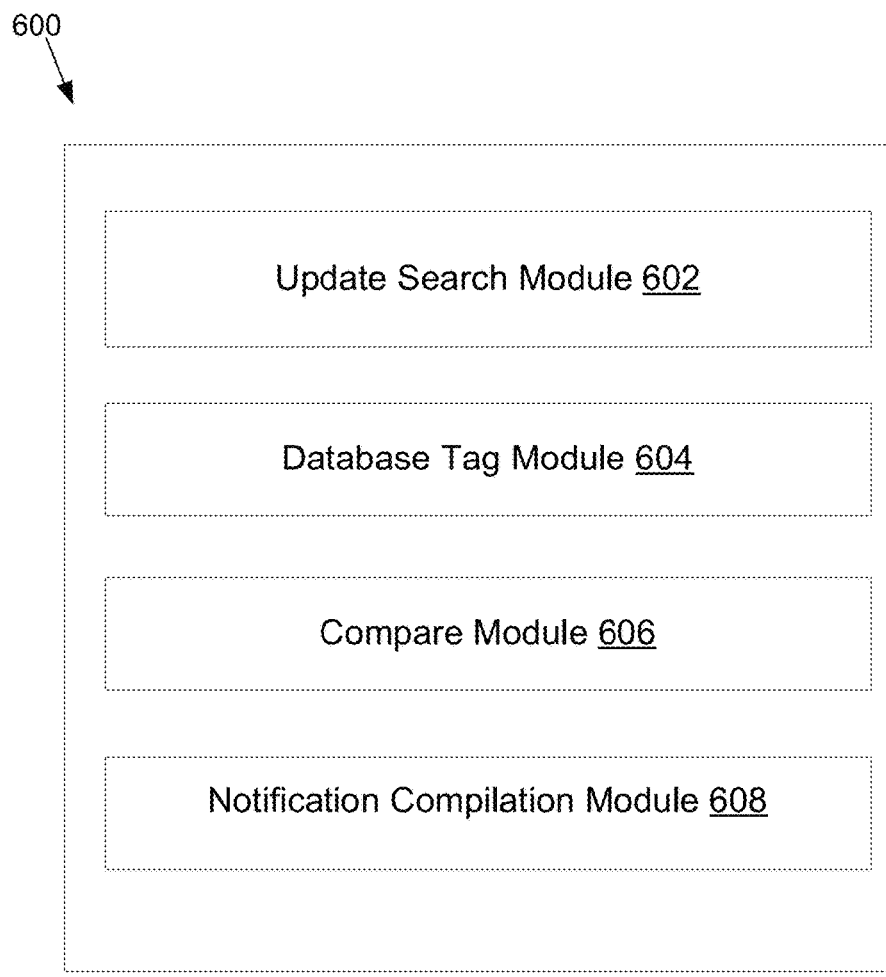
FIG. 6 illustrates software modules that may be used to perform some of the steps illustrated in the flow chart of FIG. 5.

In some embodiments, the operator server 102 is specifically programmed to perform certain functions, some of which are illustrated in FIG. 5. Not every step shown in FIG. 5 is used in every embodiment, and different embodiments include various combinations of the steps (or possibly additional steps than those) shown in FIG. 5. In addition, FIG. 6 illustrates software modules 600 that the operator server 102 may execute when performing one or more of the steps listed in FIG. 5. Like the software modules 400, the software modules 600 may communicate with each other in a variety of ways.

In some embodiments, the operator server 102 maintains one or more rules databases (using, e.g., the remote storage units 264 in FIG. 2B) that contain data regarding rules and updates to rules. In particular, the operator server 102 maintains the rules databases in order to monitor any changes to any rules by, e.g., the pertinent regulating agency. The operator server 102 may also monitor sources interpreting rules (e.g., judicial decisions), as well as the issuance of subsequent rules (e.g., regulations or statutes) that modify, repeal, or otherwise affect an existing rule or its implementation. The operator server 102 may also be configured to monitor secondary sources, such as news articles, law review articles, blog commentary, etc., that reference one or more rules. Thus, an update to a rule may include specific changes to the rule as well as commentary on the rule or its implementation. In some embodiments, the operator server 102 compiles and/or maintains the rules databases before receiving any profiles or transmission objects. In those embodiments, the rules databases include rules that may not be referenced in any particular transmission object. In other embodiments, the operator server 102 compiles and/or maintains the rules databases based on information contained in profiles or in transmission objects.

The operator server 102 may automatically maintain those rules databases (and monitor the sources mentioned above) in a variety of fashions. For example, referring to FIG. 6, the operator server 102 may execute an update search module 602 that actively searches for updates to rules. For example, the update search module 602 may be configured to search a specific database (e.g., an external database of a regulating agency) to which updates to rules are published in order to identify rules that have been issued or modified by that regulating agency. The update search module 602 may also search databases that compile and publish rules updates to rules in many jurisdictions relating to many different topics. In some embodiments, the update search module 602 searches for specific key terms identified in a predetermined list of key terms, and/or may search for terms that identify a particular source of rules (e.g., "CFR"). In addition to those sources, the update search module 602 may searching the Internet for news stories or blog commentary referencing rules. The update search module 602 may also receive messages that inform the operator server 102 that one or more rules have been modified or amended.

For example, if the Ohio EPA changed the standards set in OAC 3745-19, the operator server 102 may receive the changes to OAC 3745-19 through a received message and/or through active searching by the update search module 602. The operator server 102 stores that information in the rules databases (e.g., remote database 264 in FIG. 2B). In particular, the operator server 102 may store data indicating that OAC 3745-19 was amended, the date that OAC 3745-19 was amended, and/or the specific changes made to that rule. Again, references to OAC 3745-19 are exemplary only; each notification may relate to a variety of rules in any number of jurisdictions, federal or state, national or international. In addition, each message may simply indicate that a rule was referenced in a secondary source or may include a copy of that secondary source.

When compiling data into the rules databases, the operator server 102 may use a database tag module (604 in FIG. 6) that automatically associates sets of data (e.g., rules or updates to rules) with particular key terms, tags, or metadata. For example, if a rules database includes a news article discussing the potential effects of a proposed change to one of Ohio's "Open Burning Standards," the database tag module 604 tags that news article with metadata referencing the specific rule discussed in the article, as well as general terms identifying the topic (e.g., Air Pollution) and/or jurisdiction (Ohio). In some embodiments, an operator uses the operator server 102 or operator computer 104 to manually add metadata or tags to the data in the rules databases alone or in conjunction with the database tag module 604.

Referring now to FIG. 5, the operator server 102 receives a transmission object from a compliance computer 108, as shown in step 502. The operator server 102 may receive multiple transmission objects from different compliance computers 108. The operator server 102 may receive the transmission objects using a wireless connection, such as a cell phone or a wireless internet adaptor, or may receive the transmission object over a wired connection to, e.g., the Internet. The operator server 102 stores the transmission objects in memory, as shown in block 504. The memory may be a local memory or may be a remote storage unit 264 in FIG. 2B. The operator server 102 may sort and organize each transmission object by the compliance computer 108 and/or compliance officer that sent the transmission object. The sorting and organizing step may include adding additional metadata or tags to each transmission object that reference, for example, identification information provided in the profile of each entity.

The operator server 102 reads the data in each transmission object and identifies one or more rules (e.g., OAC 3745-19, which is a regulation promulgated by the Ohio Environmental Protection Agency relating to "Open Burning Standards") associated with each transmission object, as shown in block 506. The operator server 102 may then search the rules databases for updates to those identified rules, as shown in block 508. If the transmission object does not directly identify a rule, for example, if the transmission object identifies only a jurisdiction and/or topic, the operator server 102 searches the rules databases for applicable (and, in some embodiments, updated) rules pertinent to the jurisdiction and/or topic. To search the rules databases for pertinent updated rules and/or updates to identified rules, the operator server 102 may use a compare module (606 in FIG. 6) that extracts the information (e.g., metadata or tags) in each transmission object and compares that information to the data (e.g., the metadata or tags created by the database tag module 604) in the rules databases. The compare module 606 may use a search algorithm to match key terms, or may use a different set of criteria to identify changes to the rules referenced in each transmission object. Thus, the operator server 102 may use the rules databases to generate a set of information that identifies the most accurate rules pertinent to the entity and its operations.

The operator server 102 uses that set of information to create or compile a notification, as shown in block 510 in FIG. 5. In particular, the operator server 102 may use a notification compilation module (608 in FIG. 6), which receives information from the compare module 606 and incorporates that information into a notification. The notification is a computer object that may be based on, for example, xml, html, or any other data format. In some embodiments, the notification compilation module 608 incorporates into the notification the specific section or sections of the template or initial compliance documents (e.g., page 4 or section 2(b)) in which the rule (e.g., OAC 3745-19) is referenced, using data from the transmission object. If a rule has been modified, the notification may contain the specific changes to the rule or may simply indicate that the rule was changed. If the rule has been referenced in a secondary source, the notification may include a copy of that secondary source or may simply provide reference information for that secondary source.

For a specific example, the operator server 102 receives a message indicating that OAC 3745-19 was amended or, using the update search module 602, may discover that OAC 3745-19 was amended. The operator server 102 then stores, in the rules databases, data indicating that OAC 3745-19 was amended, the date OAC 3745-19 was amended, the specific changes to OAC 3745-19, and/or other information pertinent to that rule and the changes to that rule. The operator server 102 then uses the database tag module 604 to add metadata identifying the rule itself, the jurisdiction (Ohio), the topic (Air Pollution) and/or other metadata relevant to that rule (e.g., other key terms such as $CO_2$). The operator server 102 uses the compare module 606 to search each stored transmission object and extract the metadata or tags therein, and then compares the metadata in the transmission object to the metadata created by the tag module 604. If the metadata stored in the transmission object includes, e.g., a reference to OAC 3745-19, Ohio, and/or air pollution (or other key terms), the compare module 606 sends data regarding the updated rule (and its associated metadata) to the notification compilation module 608, which creates a notification that incorporates the information received from the compare module 606.

As shown in block 512 of FIG. 5, the operator server 102 sends the notification to the compliance computer 108 that sent the transmission object. The operator server 102 may send that notification wirelessly, using a cellular telephone connector or a wireless internet adaptor, or it may send the notification over a wired connection (e.g., a modem) through the Internet. That process may be repeated for each transmission object. In some embodiments, the operator server 102 is configured to send a notification to each compliance computer 108 on a regular basis to report any changes in the jurisdictions, the topics, and/or the rules identified in the templates. In other embodiments, the operator server 102 is configured to transmit notifications whenever a change in the rules is detected or whenever the compliance computer 108 requests a notification.

Once the compliance computer 108 receives the notification from the operator server 102, the compliance computer 108 (possibly in conjunction with the compliance officer) updates the initial compliance documents using the information in the notification. For example, in embodiments in which the notification identifies the section or sections in the initial compliance documents that reference the rule or rules in the notification, the compliance officer can quickly move to those sections and incorporate the updates. In some embodiments, the operator computer 108 may update the compliance documents automatically using a compliance document update module (410 in FIG. 4). For example, the compliance document update module 410 searches the received notification and identifies OAC 3745-19 as a modified rule. The compliance document update module 410 searches the compliance documents for the appropriate place to update the compliance documents. If the notification includes a reference to the section or sections in the initial compliance documents that reference the modified rules, the compliance document update module 410 may use that information to quickly and accurately update the compliance documents.

More specifically, in the course of updating the compliance documents, the compliance document update module 410 may use the metadata referencing the section or sections of the initial compliance document in which a rule (e.g., OAC 3745-19) was referenced, or it may search the initial compliance documents for direct references to that rule. The compliance document update module 410 may also search the metadata created by the compliance document tagging module 404 for terms related to OAC 3745-19. Once the appropriate location or locations are identified, the compliance document update module 410 incorporates the changes for OAC 3745-19 into the compliance documents. That step may involve substituting the entire text of OAC 3745-19, adding the text of amended OAC 3745-19 next to the original OAC 3745-19, adding or substituting only the amended sections of OAC 3745-19, or simply adding a reference to where a compliance implementer may access OAC 3745-19 as amended.

In some embodiments, the compliance document update module 410 propagates the changes made to in a particular section of the compliance documents to other sections of the compliance documents. For example, the compliance officer (and/or compliance computer 108) may use the notification to update a rule in a particular section of the compliance manual. The compliance computer 108 may then make similar changes to related sections of, for example, auditing documents that use the rules and procedures as set by the compliance manual.

Figure 7:
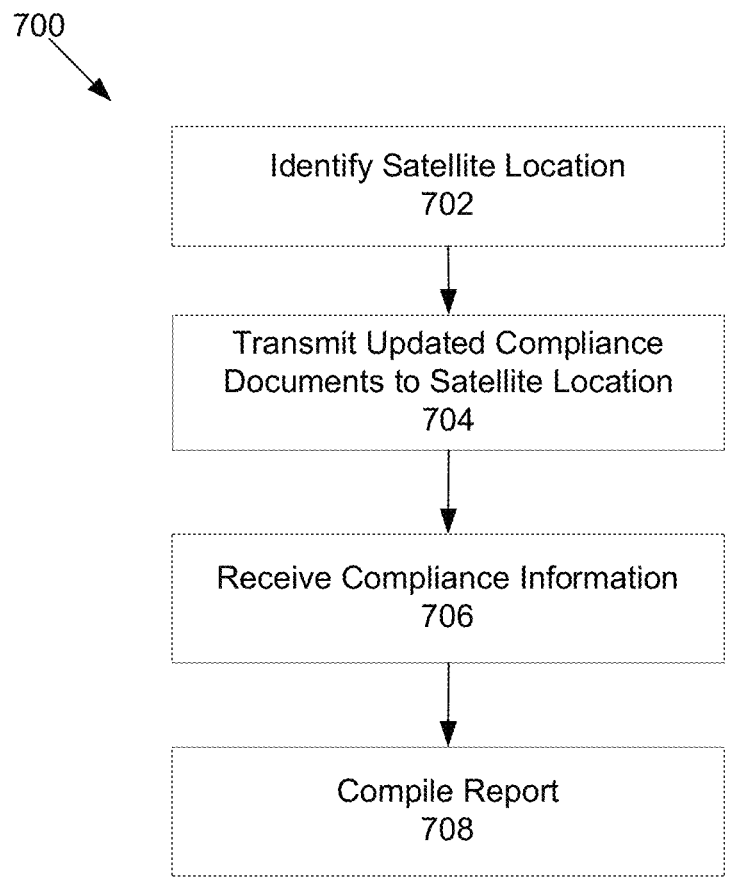
FIG. 7 illustrates a flow chart depicting steps for transmitting updated compliance documents to satellite locations according to embodiments of the present invention.

According to some embodiments, the compliance computer 108 is configured to transmit the updated compliance documents to one or more engineer computers (e.g., engineer computer 110, 112, and/or 114), receive compliance information from those engineer computers, and compile a report. FIG. 7 illustrates exemplary steps that may be used by the compliance computer 108 when interfacing with the engineer computers, though not every step shown in FIG. 7 is used in every embodiment and different embodiments include various combinations of the steps (or possibly additional steps than those) shown in FIG. 7. In those embodiments, the compliance computer 108 identifies one or more satellite locations, as shown in step 702. In some embodiments, this can be done using a satellite identification module (412 in FIG. 4). Referring back to FIG. 4 (with some reference to FIG. 7), the satellite identification module 412 operates by sorting through a locally-stored list of satellite locations on the compliance computer 108. The satellite identification module 412 transmits that data to a satellite compliance module 414. The satellite compliance module 414 transmits the updated compliance documents to the satellite location (e.g., to the engineer computers at each satellite location) using, for example, a cellular telephone connector or wireless internet adapter. The satellite compliance module 414 may also transmit the updated compliance documents using a wired connection, for example, a modem connection to the Internet. This transmission is also indicated by step 704 of FIG. 7.

In some embodiments, the satellite compliance module 414 does not transmit all of the compliance documents, but instead identifies and transmits only those documents or portions of documents pertinent to each satellite location. For example, if the satellite identification module 412 identifies a satellite office in Ohio, the satellite compliance module 414 could extract the compliance documents or portions of the compliance documents pertinent to Ohio (e.g., those documents referencing OAC 3745-19). Other documents identified and transmitted by the satellite compliance module 414 may include a request for information in the form of an audit and/or reporting form (along with instructions on how to complete each form) for engineers and/or compliance personnel at each satellite location. To identify the pertinent compliance documents or the pertinent portions of the compliance documents, the satellite compliance module 414 may use (in whole or in part) the tags and/or metadata created by the compliance document tagging module 404. Other information that may be used by the satellite compliance module 414 (and gathered by the satellite compliance module 414 from, e.g., an internal database) may include the experience and/or responsibilities of the compliance personnel at each satellite location.

The auditing and reporting forms are completed by engineers and/or compliance personnel at each satellite location, as described in more detail below. The engineers and/or compliance personnel transmit the information required by the audit or reporting forms to the compliance computer 108. As shown in step 706, the compliance computer 108, and, e.g., the satellite compliance module 414 in particular, may receive that compliance information over the Internet or over a secured connection using, e.g., a cellular telephone connector, a wireless internet adapter, or a wired connection such as a modem. Thus, the compliance computer 108 may communicate with the engineer computers 110, 112, and/or 114 via the Internet or through a private network. In some embodiments, the compliance computer 108 may be configured to transmit the compliance documents on a regular basis (e.g., monthly or quarterly) or may be configured to transmit the compliance documents upon instruction.

In some embodiments, the satellite compliance module 414 automatically compares the information transmitted from each satellite location to the standards set in the updated compliance documents. In other embodiments, the satellite compliance module 414 assists the compliance implementer in comparing the data transmitted from the satellite locations to the standards in the updated compliance documents. Whether operating to automatically compare the data or assisting the compliance implementer in comparing the data, the satellite compliance module 414 may use the tags and/or metadata in the updated compliance documents to quickly identify relevant sections of the updated compliance documents and/or the information contained therein.

By comparing the data received from the satellite locations to the rules in the updated compliance documents, the compliance computer 108 (automatically and/or in conjunction with the compliance officer) may verify the compliance of each satellite office with the pertinent rules. A report may then be compiled, as shown in step 708 of FIG. 7, which details the compliance of one or all of the satellite locations with their respective rules. In particular, the compliance computer 108 may use a report module 416, which collects compliance data (e.g., statistics, raw data transmitted from the satellite locations, etc.) from the satellite compliance module 414 and creates a report using that data.

In some embodiments, the report module 416 reformats the data received from the engineer computers into a format required by the regulatory authorities. For example, the updated compliance documents may ask for data in a format convenient for the engineer and/or compliance personnel (e.g., the amount of carbon dioxide in cubic meters) while the pertinent rules may require that the data be submitted to authorities by weight rather than volume. In other scenarios, the updated compliance documents may ask for data in a proprietary format (e.g., by referencing the number or size of products produced). In those embodiments, the report module 416 automatically converts the data into a format compatible with pertinent rules. Once the reports are compiled, the compliance computer 108 (automatically and/or in conjunction with the compliance officer) may transmit those reports to the pertinent authorities (whether external regulators or internal auditors).

Figure 8:
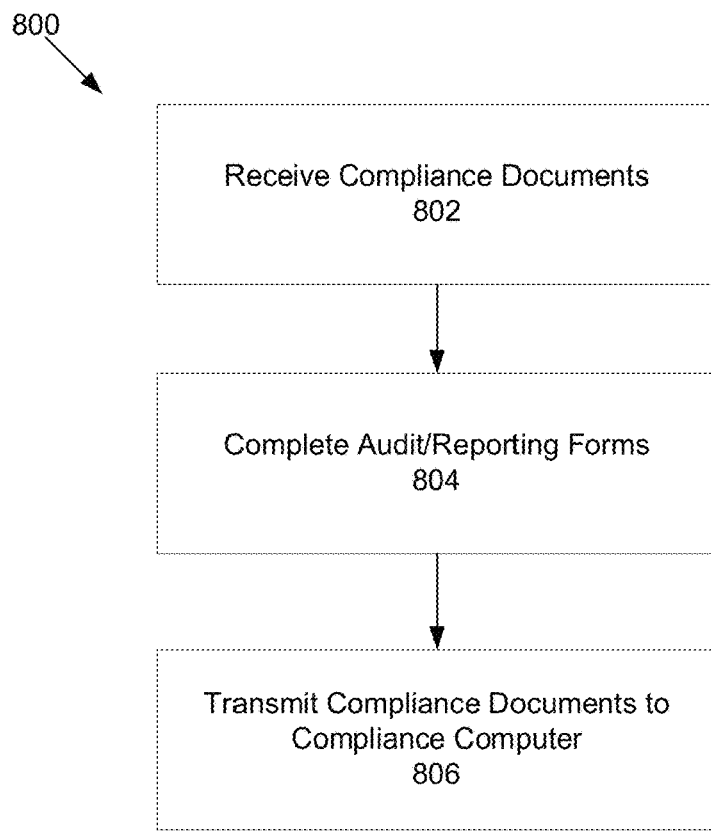
FIG. 8 illustrates a flow chart depicting steps for completing and transmitting compliance documents according to embodiments of the present invention.

FIG. 8 illustrates steps that may be performed (in whole or in part) by the engineer computers 110, 112, 114 to submit compliance data to the compliance computer 108. Not every step shown in FIG. 8 is used in every embodiment, and different embodiments include various combinations of the steps (or possibly additional steps than those) shown in FIG. 8. As discussed above, each engineer computer (e.g., engineer computer 110) receives compliance documents, as shown in block 802, which may include auditing or reporting forms. In some embodiments, the engineer computer 110 receives only those parts pertinent to the engineers and/or compliance personnel assigned to that particular engineer computer. Those documents may be received by, e.g., a modem or adapter in the engineer computer 110 that connect the engineer computers to a network (e.g., the Internet). The compliance audits are performed by compliance personnel who may be part of the company or who may be external to the company. In some embodiments, the engineers themselves perform the audit. In either scenario, the engineer computer 110 enables those performing the audit to access compliance documents on-site (e.g., while at a plant in a remote jurisdiction).

In some embodiments, the compliance personnel and/or engineers may access the compliance documents on handheld devices (e.g., engineer computers 110, 112, 114) and use those same devices to perform the audit and complete the audit or reporting forms, as shown in block 804. The engineer computers 110, 112, 114 may be tablets, smart phones, or any other portable electronic device that the engineers use to input data on-site. In other embodiments, the engineer computers 110, 112, 114 may be desktop computers or other non-portable computing devices. Completing the audit or reporting forms may include capturing photographs or entering other evidence as required by the compliance documents. Once each engineer has input the required information, the engineer computers 110, 112, 114 transmit the compliance documents and/or completed audit forms back to the compliance computer 108, as shown in block 806. That information may be transmitted and/or received over wired and/or wireless connections to the network. That data may be used to file forms with the local authorities (either by the local plant managers or by the compliance officer who receives the data from the hand-held devices over the Internet). That data may also be used to complete internal corporate compliance forms.

In some embodiments, inputting the compliance data and completing the auditing forms is done automatically. For example, the satellite office may employ systems designed to detect and measure $CO_2$ emissions. That information may be stored at the engineer computers 110, 112, 114 (or on local servers connected to the engineer computers) and used to automatically complete the auditing forms. The engineering computers 110, 112, 114 may also be configured to automatically compare the compliance data with the standards set by the updated compliance documents. In some embodiments, those systems assist local personnel in inputting the compliance data and comparing the compliance data with the standards set in the updated compliance documents. For example, the engineering computers 110, 112, 114 may prompt the local personnel to input the data in a specific format or may automatically verify that the data is within the boundaries set by the pertinent rules.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

We claim:

1. A distributed, computer-based system for filtering content in order to update compliance policies in a compliance document while protecting confidential information in the compliance document, the distributed computer-based system comprising:
  a local computer system including one or more processors and a non-transitory storage medium containing instructions that, when executed by the one or more processors, cause the one or more processors to:
    identify a reference to a compliance rule in the compliance document and a location in the compliance document in which the compliance rule is referenced; and
    create a transmission object including metadata in place of the confidential information from the compliance document and a subset of information from the compliance document, the subset of information including the reference to the compliance rule in the compliance document and location information that identifies the location in the compliance document in which the compliance rule information is referenced, the metadata identifying a section of the compliance document that includes the confidential information; and
  a remote computer system including:
    a transmission object receiver configured to receive the transmission object using one or more processors of the remote computer system and to parse the reference to the compliance rule in the compliance document from the location information and to extract the metadata;
    a compliance rules database containing data regarding a set of compliance rules;
    the one or more processors of the remote computer system executing instructions stored in a non-transitory medium of the remote computer system to:
      identify a compliance rule applicable to the entity using the data in the compliance rules database and the reference to the compliance rule in the compliance document from the transmission object, wherein the one or more processors of the remote computer system are configured to receive the reference to the compliance rule in the compliance document from the transmission object receiver; and
      compile an electronic notification indicative of the identified compliance rule and to compile the location information and the metadata identifying the section of the compliance document that includes the confidential information from the transmission object into the electronic notification, wherein the one or more processors of the remote computer system are configured to receive the location information from the transmission object receiver; and
    a transmitter configured to transmit the electronic notification to the entity.

2. The system of claim 1, further comprising a database tag module configured to analyze the data in the compliance rules database and create:
  a) data in the compliance rules database identifying a plurality of jurisdictions associated with the set of compliance rules; and
  b) data in the compliance rules database identifying a plurality of topics associated with the set of compliance rules.

3. The system of claim 2, wherein the reference to the compliance rule in the compliance document in the transmission object identifies a jurisdiction and a topic associated with the entity's operations, and wherein the one or more processors of the remote computer system are configured to search the compliance rules database to determine compliance rules pertinent to the entity by locating compliance rules associated with the jurisdiction and the topic identified in the transmission object.

4. The system of claim 1, further comprising an update search module configured to receive updates to the set of compliance rules and to store the updates in the compliance rules database.

5. The system of claim 4, wherein the update search module is configured to search for updates to the set of compliance rules.

6. The system of claim 4, wherein the update search module is configured to search external databases for an update to the compliance rule using the reference to the compliance rule in the compliance document in the transmission object.

7. The system of claim 1, wherein the one or more processors of the remote computer system are further configured to identify an update to the compliance rule using the data in the compliance rules database, and to compile a notification indicative of the identified update to the compliance rule.

8. The system of claim 1, wherein the transmission object is a first transmission object, the reference to the compliance rule in the compliance document in the first transmission object is a first reference to a first compliance rule in a first compliance document, and:
  wherein the transmission object receiver is further configured to receive a second transmission object, the second transmission object including a second reference to a second compliance rule in a second compliance document;
  wherein the one or more processors of the local computer system are further configured to identify a second compliance rule using the data in the compliance rules database and the second reference to the second compliance rule in the second compliance document in the second transmission object;
  wherein the electronic notification is a first electronic notification, and wherein the one or more processors of the remote computer system are further configured to compile a second electronic notification using the identified second compliance rule; and
  wherein the transmitter is further configured to transmit the second electronic notification.

9. The system of claim 1, further comprising a template generator and a profile receiver, wherein the profile receiver is configured to receive a profile, and wherein the template generator is configured to create a template using the received profile.

10. The system of claim 9, wherein the received profile includes key terms and wherein the one or more processors of the local computer system are further configured to use the key terms in the received profile to identify the compliance rule.

11. The system of claim 1, wherein the metadata in the transmission object is used in place of entity-specific compliance policies or employee identification.

12. A computer-implemented method for informing an entity of an update associated with a compliance rule using a distributed computing system, the method comprising:
creating a template, using one or more processors at a remote computer system, that includes metadata identifying a section in a compliance document that includes employee identification information, wherein creating the templates includes prompting the entity to incorporate at least one key term into a particular section of the compliance document, the at least one key term associated with one of the following: a compliance rule pertinent to the entity's operations, a topic pertinent to the entity's operations, and a jurisdiction pertinent to the entity's operations;
creating a transmission object using one or more processors at a local computer system, the transmission object including the metadata in place of the section of the compliance document with the employee identification information and a subset of information from the compliance document, the subset of information including location information identifying the particular section of the compliance document and the at least one key term and excluding the employee identification information;
receiving the transmission object using the one or more processors of the remote computer system;
parsing the compliance rule information from the location information using the one or more processors of the remote computer system;
identifying the metadata and the at least one key term in the transmission object using the one or more processors of the remote computer system;
searching a compliance rules database containing updates to a set of compliance rules using the one or more processors of the remote computer system to identify an update that is pertinent to the compliance rule, the topic, or the jurisdiction associated with the at least one key term or the metadata in the transmission object;
creating a notification using the one or more processors of the remote computer system, the notification including the update and the location information from the transmission object identifying the particular section of the compliance document; and
sending the notification to the local computer system.

13. The computer-implemented method of claim 12, further comprising receiving updates to the set of compliance rules and storing the updates in the compliance rules database, wherein receiving the updates occurs before receiving the transmission object.

14. The computer-implemented method of claim 12, further comprising searching for updates to the set of rules using the identified at least one key term in the received transmission object.

15. The computer-implemented method of claim 12, wherein identifying the at least one key term in the transmission object includes identifying the jurisdiction pertinent to the entity's operations and the topic pertinent to the entity's operations, and wherein searching the compliance rules database to identify the update includes searching for data in the compliance rules database that matches the jurisdiction and the topic pertinent to the entity's operations.

16. The computer-implemented method of claim 12, further comprising maintaining the compliance rules database.

17. The computer-implemented method of claim 16, wherein maintaining the compliance rules database includes tagging an update to associate that update with a jurisdiction and a topic.

18. The computer-implemented method of claim 12, wherein the update comprises a secondary source discussing the compliance rule, the topic, or the jurisdiction, and wherein creating the notification that includes the update comprises incorporating a copy of the secondary source into the notification.

19. A distributed system for updating a compliance document, the system comprising:
a local computing system, including one or more processors and instructions contained in a non-transitory storage medium, the local computing system configured to:
filter information in the compliance document to parse a citation to at least one compliance rule at a specific location in the compliance document from at least one policy specific to a first entity regarding its compliance with the compliance rule; and
create a transmission object by compiling metadata and compliance rule information and location information into the transmission object, the metadata compiled in the transmission object in place of the at least one policy specific to the first entity from the compliance document, the compliance rule information including the citation to the compliance rule from the compliance document, and the location information including the specific location of the citation in the compliance document; and
a remote computing system including:
means for receiving the transmission object, the means for receiving being configured to parse the compliance rule information from the location information and to extract the metadata;
means for maintaining a compliance rules database that includes metadata identifying topics pertinent to a set of updated compliance rules;
one or more processors executing instructions stored in a tangible, non-transitory storage medium to identify an updated compliance rule in the set of updated compliance rules using the transmission object; and
create and transmit a notification incorporating the updated compliance rule using the location information.

20. The system of claim 19, further comprising means for updating a compliance rule in a compliance document using the notification.

21. A distributed system for limiting distribution of confidential information from a compliance document while enabling communications of non-confidential information from the compliance document by incorporating metadata throughout the distributed system, the distributed system comprising:
a first computer system including one or more processors and computer-readable storage media containing instructions that, when executed by the one or more processors of the first system, cause those one or more processors to:

analyze the compliance document for a first entity, the compliance document including metadata identifying at least one compliance rule at a specific location in the compliance document and at least one policy specific to the first entity regarding its compliance with the compliance rule; and create a transmission object by incorporating the metadata into the transmission object in place of the at least one policy specific to the first entity from the compliance document; and a second computer system including one or more processors and computer-readable storage media containing instructions that, when executed by the one or more processors of the second computer system, cause those one or more processors to:

receive the transmission object from the first computer system;

parse the metadata from other information in the compliance document;

search, based on the metadata, a compliance rules database containing updates to a set of compliance rules to identify an update that is pertinent to the compliance rule;

create a notification, the notification including the identified update and the specific location of the citation from the transmission object; and send the notification to the first computer system.

22. The distributed system of claim 21, wherein the compliance document includes employee information, and wherein the metadata incorporated into the transmission object is used in place of the employee information.

\* \* \* \* \*